(12) United States Patent
Vigeant et al.

(10) Patent No.: US 6,469,904 B1
(45) Date of Patent: Oct. 22, 2002

(54) HOUSING FOR COMPUTER COMPONENTS

(75) Inventors: Mark Robert Vigeant; Christopher Lee Bostedt, both of Granite Bay, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/562,619

(22) Filed: May 1, 2000

(51) Int. Cl.[7] .................................................. H05K 5/00
(52) U.S. Cl. ....................... 361/752; 361/759; 174/35 R
(58) Field of Search .................................. 361/736, 737, 361/752, 759, 800, 816, 818; 174/35 R, 35 GL

(56) References Cited

U.S. PATENT DOCUMENTS

| | | | | |
|---|---|---|---|---|
| 5,014,160 A | * | 5/1991 | McCoy, Jr. .................. 361/424 |
| 5,353,201 A | * | 10/1994 | Maeda ......................... 361/816 |
| 5,844,784 A | * | 9/1998 | Moran et al. ................ 361/818 |
| 5,895,884 A | * | 4/1999 | Davidson .................. 174/35 R |
| 6,194,653 B1 | * | 2/2001 | McMiller et al. ...... 174/35 GC |
| 6,313,400 B1 | * | 11/2001 | Mosquera et al. ........ 174/35 R |

* cited by examiner

Primary Examiner—Jeffrey Gaffin
Assistant Examiner—Tuan Dinh

(57) ABSTRACT

A housing, preferably configured for computer components, which features a base and a cover. The base preferably includes a series of dimples on its sides, and the cover preferably includes a series of projections that are aligned to mate with the dimples on the base in order to aid in securing the cover to the base. Alternately, the cover may include the dimples and the base may include the projections. In addition to the securing function, the dimples and projections also serve to disturb the electromagnetic waves emitted from the components located within the housing, so that the electromagnetic noise emitted from the housing is reduced. Additionally, the front surfaces of the base and the cover are preferably linked together by a hinge-type connection formed by interlocking tabs located on both surfaces. This hinge-type connection facilitates the alignment of the cover with the base so that the cover may simply be closed upon the base and the dimples/projections are then aligned to mate with each other.

20 Claims, 5 Drawing Sheets

HOUSING FOR COMPUTER COMPONENTS

The present invention relates generally to a housing including a base and a cover, and more particularly to a housing for enclosing computer components. The housing is of a design that minimizes the need for threaded fasteners, and preferably includes a base, a cover, a plurality of dimples and a plurality of projections positioned on the base and the cover. The dimples and projections are arranged to mate with each other to aid in securing the cover and the base together. The preferred embodiment further includes a hinge-type arrangement for connecting the fronts of the base and the cover, and apertures for making several threaded connections on the rear surfaces of the base and the cover. Preferably, the only threaded connections used to secure the base and the cover together are those located on the rear surfaces.

BACKGROUND OF THE INVENTION

Various forms of housings for computer components are known in the art. One common problem with many known housing configurations is that in order to properly secure the base to the cover, a relatively large number of screws are often required. Each of these screws takes a certain amount of time to be inserted and tightened. Moreover, these screws are often arranged on all four sides of the housing. Thus, additional assembly time is required in order to rotate the housing so that an operator can insert and tighten the screws, or additional machinery is required if the screws on all sides of the housing are tightened through the use of automated assembly machines that are capable of tightening the screws on all sides of the housing simultaneously.

Elimination of some of the screws allows for a cost savings, which is due in part to the cost of the screws, but is also due to savings resulting from the assembly process. In particular, labor costs and/or automated machinery costs may be reduced through the use of less screws, particularly if the remaining screws are all located on a single face of the housing. However, the elimination of screws may result in inadequate attachment of the cover to the base. Accordingly, in order to realize a cost savings from the elimination of screws, an alternate means of securing the cover and the base together must be devised, and this alternate securing means must adequately secure the two components together, as well as being more economical than the screws it is replacing.

In addition to the securing function, the screws also perform a function related to electromagnetic noise. The computer components located within a computer housing typically generate electromagnetic waves that escape from the housing, creating electromagnetic noise for other electronic components in the vicinity. Because the screws used to secure the components of the housing together disturb these electromagnetic waves, electromagnetic noise is reduced by the presence of the screws. Thus, simply eliminating screws from the assembly process may result in the creation of unwanted electromagnetic noise, unless other measures are taken to reduce such noise. Accordingly, any alternate securing means preferably also performs the function of minimizing the electromagnetic noise emanating from the housing.

An additional problem associated with many of the currently available computer housings relates to the alignment of the cover with the base. Additional time is often required to align these two components together so that the screw holes properly align with each other. Thus, in addition to the features discussed above, any improved housing configuration also preferably aids in the alignment of the cover with the base during assembly.

Accordingly, one object of the present invention is to provide an improved housing for computer components which is of a design that allows for a simplified assembly process.

A second object of the present invention is to provide an improved housing in which the assembly costs are reduced when compared to traditional designs.

Another object of the present invention is to provide an improved housing in which the number of screws required for affixing the cover to the base is reduced, while still maintaining a secure connection between these two components.

An additional object of the present invention is to provide an improved housing of a design that facilitates alignment of the cover with the base.

A fifth object of the present invention is to provide a housing for computer components in which electronic noise emitted from the housing is reduced, even without relying upon screws for connecting the sides of the cover to the sides of the base.

A sixth object of the present invention is to provide a housing assembly that includes a series of mating dimples and projections for aiding in the attachment of the cover to the base.

Another object of the present invention is to provide a housing assembly in which a hinge-type connection is used to facilitate the alignment of the cover with the base.

These and other objects of the present invention are discussed or will be apparent from the following description of the present invention.

SUMMARY OF THE INVENTION

The above-listed objects are met or exceeded by the present housing, which features a base and a cover. The base preferably includes a series of dimples on its sides, and the cover preferably includes a series of projections that are aligned to mate with the dimples on the base in order to aid in securing the cover to the base. Alternately, the cover may include the dimples and the base may include the projections. In addition to the securing function, the dimples and projections also serve to disturb the electromagnetic waves emitted from the components located within the housing, so that the electromagnetic noise emitted from the housing is reduced.

The front surfaces of the base and the cover are preferably linked together by a hinge-type connection formed by interlocking tabs located on both surfaces. This hinge-type connection facilitates the alignment of the cover with the base, so that the when the cover is closed upon the base, the dimples/projections are aligned to mate with each other.

More specifically, the present invention provides a housing for computer components that includes a base with at least a first section and a second section, and a cover with at least a third section and a fourth section. The third section of the cover is configured and arranged to face the first section of the base, and the fourth section of the cover is configured and arranged to face the second section of the base. The housing also includes a plurality of dimples and a plurality of projections corresponding to the dimples. The dimples and the projections are configured and arranged to mate with each other to aid in securing the cover to the base.

Even more specifically, the present invention provides a housing for computer components that includes a base with at least a generally horizontally-extending bottom section, a first section extending upwardly in a generally vertical manner from a first edge of the bottom section, a second section extending upwardly in a generally vertical manner from a second edge of the bottom section, and a front section extending upwardly in a generally vertical manner from a bottom front edge of the bottom section. The bottom front edge preferably connects the first edge with the second edge.

The present invention of this embodiment also includes a cover with at least a generally horizontally-extending top section, a third section extending downwardly in a generally vertical manner from a third edge of the top section, a fourth section extending downwardly in a generally vertical manner from a fourth edge of the top section, and a top front edge connecting the third edge with the fourth edge.

In this configuration, the present housing may also include a plurality of dimples located on interior surfaces of the first and second sections of the base, and a plurality of projections located on exterior surfaces of the third and fourth sections of the cover. The projections on the cover are configured and arranged to mate with the dimples on the base to aid in securing the cover to the base, as well as to disturb the flow of electromagnetic waves passing from the interior of the housing to the exterior of the housing.

Additionally provided in this embodiment are a plurality of first tabs located on the front section of the base, and a plurality of second tabs located on the front edge of the cover. The first tabs and the second tabs are configured and arranged to cooperate with each other to form a hinge-type connection between the base and the cover.

BRIEF DESCRIPTION OF THE DRAWINGS

Preferred embodiments of the present invention are described herein with reference to the drawings wherein.

DETAILED DESCRIPTION OF THE INVENTION

Figure 1:
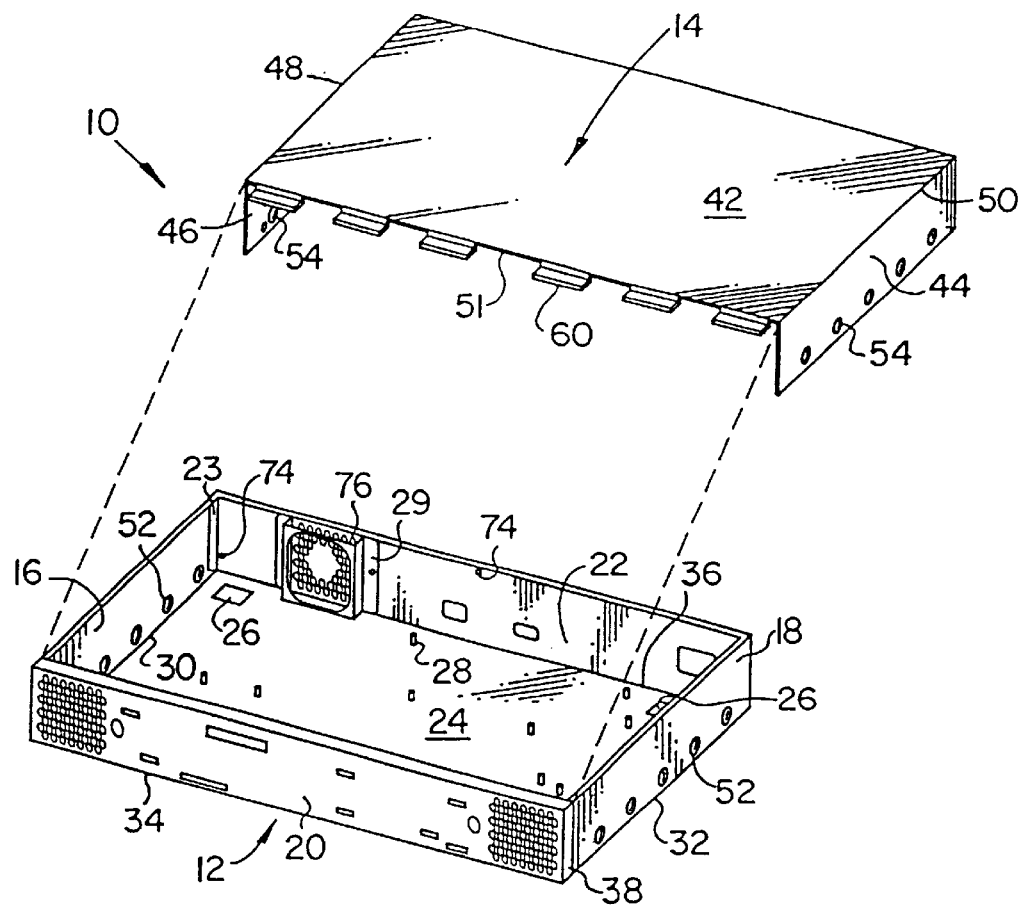
FIG. 1 shows an exploded view of an embodiment of the present housing with the cover separated from the base.

Referring to FIG. 1, a preferred embodiment of the present housing 10 is shown to include a base 12 and a cover 14. Preferably, the base 12 and the cover 14 are made of sheet metal, although other materials, such as plastics, are also contemplated as being within the scope of the invention. When made from sheet metal, the base and the cover are each preferably formed of a uniform thickness, and could be manufactured by cutting a single sheet of metal for each of the two components into the desired shape, and then by folding the sheets of metal into the desired configurations to create the base or the cover, as known to those of ordinary skill in the art of sheet metal fabrication.

The base 12 preferably includes a left side section 16 and a right side section 18. The base 12 also preferably includes a front section 20 and a rear section 22. These four sections (16, 18, 20 and 22) are connected to each other via a bottom section 24. The bottom section 24 is relatively flat, and is shown as being situated in a generally horizontal plane. However, indentions such as feet 26, as well as other types of indentions and/or protrusions (such as 28), may be added in order to better accommodate the computer components that are intended to be housed within housing 10. Additionally, other configurations for attaching different components to the housing, such as fan bracket 29, may also be added. Fan bracket 29, which is used to attach a fan to the rear section 22, is described in copending U.S. application Ser. No. 09/562,878, which was filed on May 1, 2000, which application is hereby incorporated by reference.

Although the preferred embodiment depicts the bottom surface 24 as extending generally horizontally, this is not necessarily required, and the bottom surface may be oriented in any number of different directions, such as extending generally vertically. Moreover, although the bottom surface 24 will be referred to as being generally horizontal and the other surfaces (16, 18, 20, and 22) will be referred to as being generally vertical for the sake of simplicity, these directions should be considered only as they relate to each other, and should not be construed to mean that the bottom surface is always required to extend in a horizontal plane and that the other surfaces extend in a vertical plane. Similarly, the left and right sections and the front and rear sections need not be orientated as shown in the figures either, as these terms have also been used for the sake of simplicity, as well as for their connotations in relation to each other, and not in the absolute sense.

The bottom section 24 of the base 12 is preferably generally rectangular in shape. The side surfaces 16, 18 are preferably created by folding the metal at the side edges 30 and 32 of the bottom section 24. Similarly, the front section 20 and the rear section 22 are also preferably created by folding the metal at the front edge 34 and the rear edge 36, respectively. The left section 16 may be connected to the rear section 22 via an overlap 23, which is folded to be generally perpendicular to the rear section 22, and is then affixed to interior of the side section 16 via solder, rivets, or other affixing means generally known in the art. A similar overlap (not shown) is also used to affix the rear section 22 to the right section 18.

To avoid the appearance of sharp edges on the front surface of the housing, an apron 38 may be folded over the side sections 16 and 18, as well as over the top and bottom. Additionally, a bezel (such as bezel 39 of FIG. 2) may also be attached to the front surface to improve the appearance of this surface. To eliminate sharp edges on the top of the base 12, a lip 40 may be created by folding over the top edges of side sections 16 and 18 and rear section 22.

The cover 14 preferably includes a top section 42, a right section 44 and a left section 46. The top section is preferably generally rectangular in shape, and includes a left edge 48, which is where the left section 46 is folded downwardly, and a right edge, which is where the right section 44 is folded downwardly.

One important feature of the present invention relates to the manner in which the side sections (44, 46) of the cover 14 are secured to the side sections (16, 18) of the base 12. As shown in FIG. 1, the right side section 18 and the left side section 16 of the base 12 each preferably include a series of dimples 52 that are indented towards the interior of the housing 10. As the base is preferably formed of a single sheet of metal, the concave dimples 52 on the outer surfaces of the side sections 16 and 18 form convex surfaces on the interior surfaces of these same sections. These dimples 52 are preferably arranged in a straight line, but other configurations are also contemplated as being within the scope of the invention. Additionally, although five dimples 52 are shown in the FIG. 1 embodiment, configurations of more or less than five dimples are also contemplated as being within the scope of the invention.

Figure 1A:
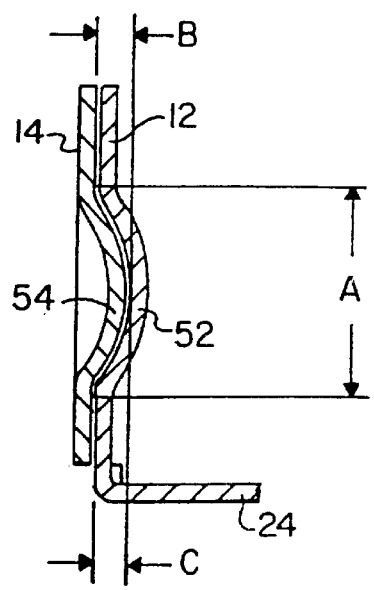
FIG. 1A is a sectional view showing one of the projections nested within one of the dimples.

The side sections 44, 46 of the cover 14 include a plurality of projections 54 that correspond to the dimples 52 on the base 12. Once again, since the cover is preferably made from a single sheet of metal, the convex projections pointing toward the interior of the housing 10 also define concave surfaces on the outside of the housing. As an alternative to forming the dimples on the base and the projections on the cover, these features may be reversed (so that the dimples are on the cover and the projections are on the base). When the cover 14 is assembled to the base 12, each projection 54 nests within one of the dimples 52 to aid in securing these two components together. FIG. 1A shows, in a cross-sectional view, one of the projections 54 nested within one of the dimples 52. Preferably, the dimples 52 are sized to be slightly deeper than the projections 54 so that the flat side surfaces (44, 46) of the cover 14 can contact, or very nearly contact, the respective flat side surfaces (18, 16) of the base 12 when the projections are nested within the dimples, as can be seen in FIG. 1A. Sample dimensions for the dimples and projections are as follows: the diameters "A" of both the dimples and the projections may be approximately 12.8 mm; the depth "B" of the projections 54 may be approximately 2.4; and the depth "C" of the dimples 52 may be approximately 2.5 mm. It should be noted that these sample dimensions are given by way of example only, and that other dimensions are also suitable.

The dimples 52 and the projections 54 help to interrupt the otherwise smooth outwardly flow of the electromagnetic waves created by the computer components located within the housing 10. Accordingly, the housing does not act as an antenna for transmitting these waves as electronic noise, which can hinder the proper operation of other nearby electronic devices.

An additional benefit realized by the use of the dimples 52 and the projections 52 is that these elements add additional rigidity to the side sections that they are provided upon, when compared with completely flat side sections. Thus, whereas the screw holes in the side sections of conventional housings may reduce the rigidity of these sections, the dimples and projections of the present invention actually improve the stiffness and rigidity of the side sections that they are provided upon.

Figure 2:
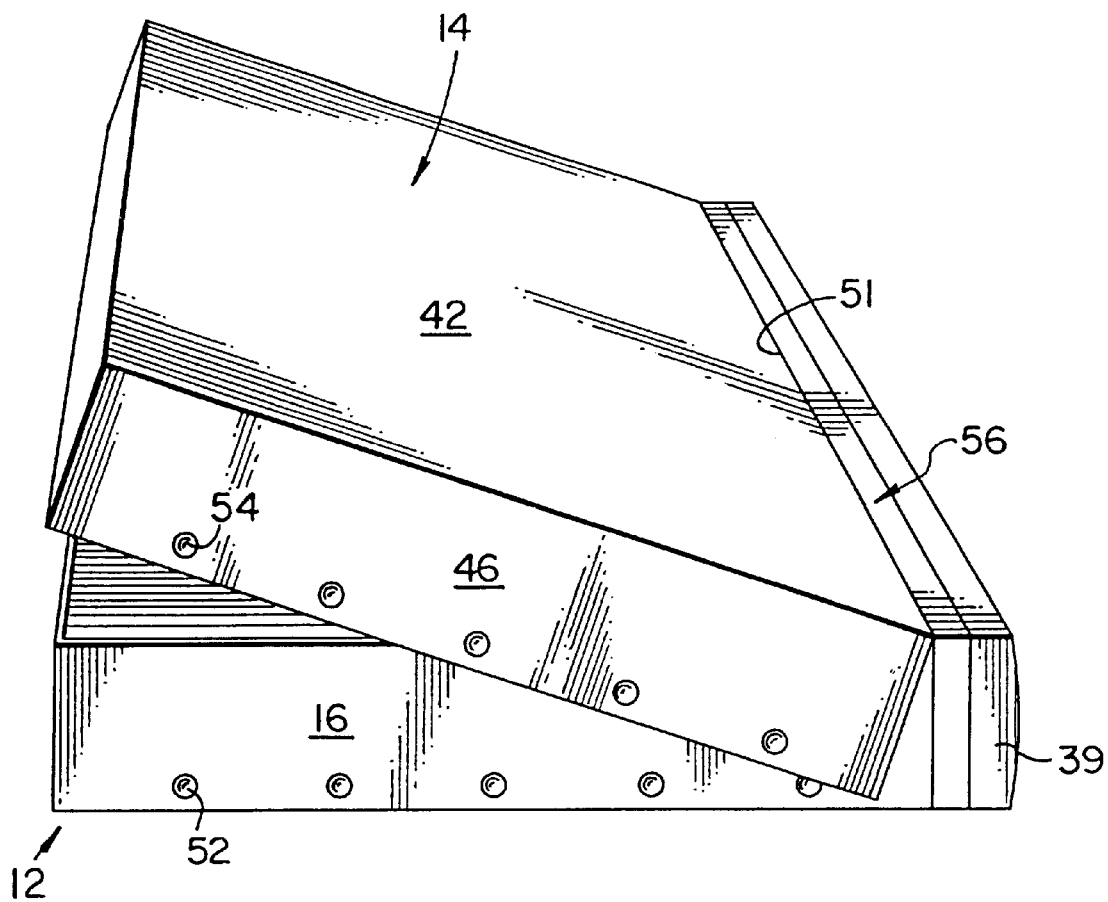
FIG. 2 is a view of the present housing shown with the cover hingedly connected to the base.

Another important feature of the present invention relates to a hinge-type connection 56 between the front surfaces of the base 12 and the cover 14. Referring now to FIG. 2, the cover 14 is shown in a partially open position as being hinged, at the hinge-type connection 56, to the base 12. In addition to affixing the front surfaces of the base 12 and the cover 14 together, this hinge-type connection 56 facilitates the alignment of the cover with the base.

Figure 3:
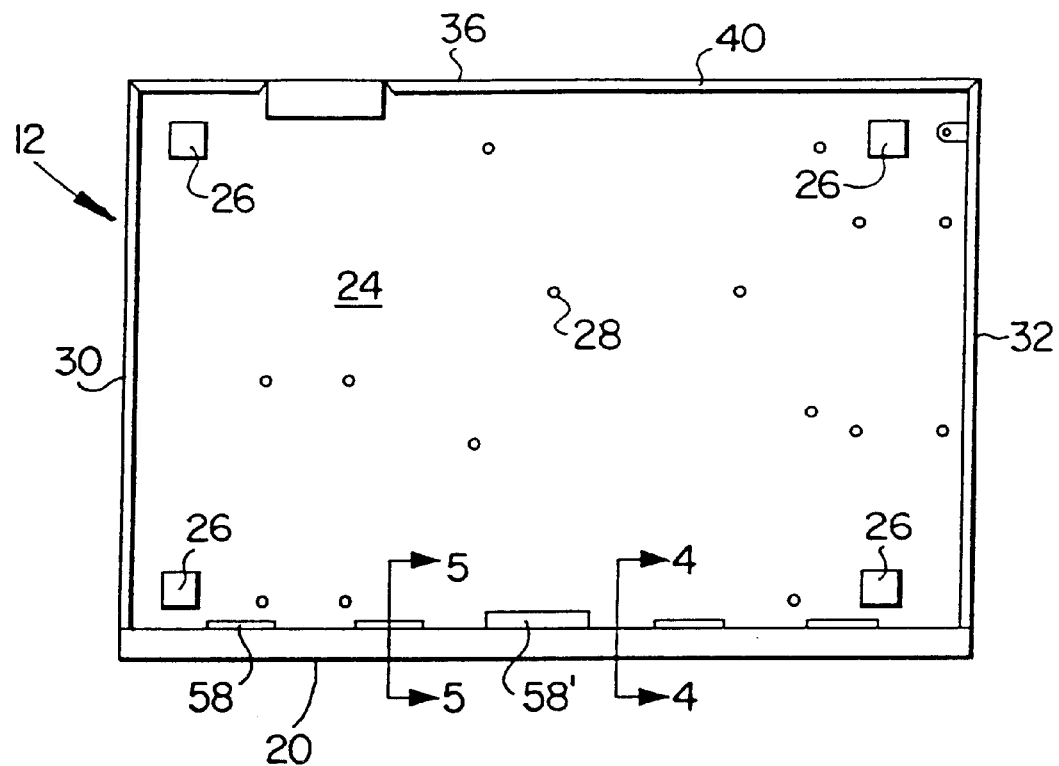
FIG. 3 is a top view of the base of the present housing.

The hinge-type connection 56 is created by a combination of first tabs 58 (FIG. 3) on the front section 20 of the base 12 and second tabs 60 (FIG. 6) on the front edge 51 of the cover 14. Preferably, the group of first tabs 58 also includes a larger tab 58', as shown in FIG. 3. This larger tab 58' provides additional support for the center of the cover 14, both during the hinging process as well as when the housing in its fully assembled state. If necessary or desired, additional larger tabs may also be added for additional support.

Figure 4:
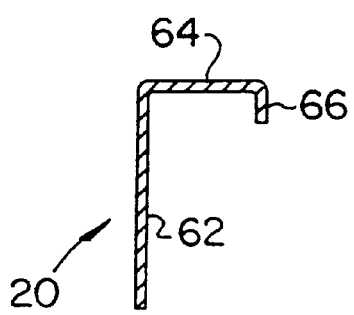
FIG. 4 is a sectional view of the base taken along line 4—4 of FIG. 3.

FIG. 4 is a cross-sectional view of the front surface 20 of the base 12 taken along line 4—4 of FIG. 3. As can be seen in FIG. 3, this area that the cross-section is taken from does not include one of the a first tabs 58. Referring again to FIG. 4, the front section 20 is generally U-shaped in cross-section, and includes a first generally vertical leg 62, a generally horizontal leg 64, and a second generally vertical leg 66. The second generally vertical leg 66 is shorter than the first generally vertical leg 62.

Figure 5:
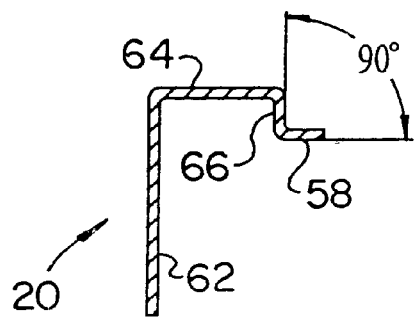
FIG. 5 is another sectional view of the base taken along line 5—5 of FIG. 3.

Referring now to FIG. 5, another cross-sectional view of the front surface 20 of the base 12 is shown. However, this cross-section is taken along line 5—5 of FIG. 3, which includes one of the first tabs 58. As can be seen in FIG. 5, the cross-section of the front section 20 includes the three legs (62, 64, 66) of the generally U-shaped cross-section of FIG. 4, but also includes the first tab 58, which extends in a generally horizontal direction, preferably making an angle of approximately 90° with the second generally vertical leg 66.

Figure 6:
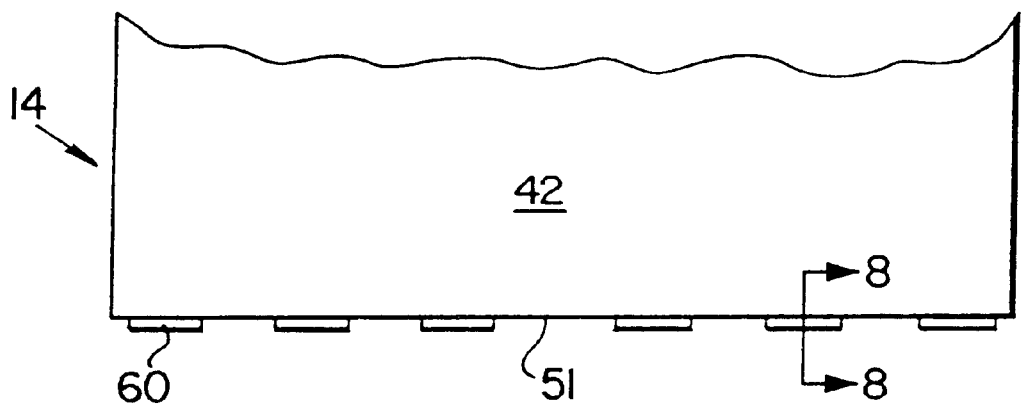
FIG. 6 is a top view of the cover of the present invention.
Figure 7:
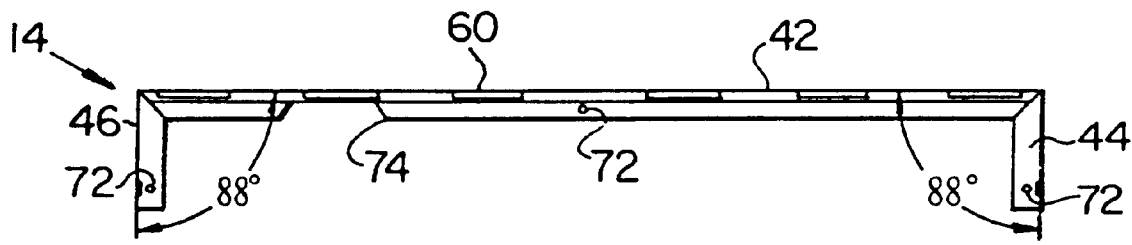
FIG. 7 shows the cover of the present invention, as seen from the front.

The second tabs 60 will be described next, while referring to FIGS. 6–8. FIG. 6 is a top view of the front portion of cover 14, showing the front edge 51 and a plurality of second tabs 60. FIG. 7 is a front view of the cover 14. As can be seen in FIG. 7, the right section 44 and the left section 46 are preferably slightly inclined at an angle of approximately 88° with respect to the top section 42. However, the left and right sections (16, 18) of the base 12 are preferably configured with an angle of approximately 90° with respect to its bottom surface 24. Accordingly, the lower portions of the left and right sections (44,46) of the cover 14 are slightly biased against the corresponding areas of the base 10 (i.e., against the lower portions of THE left and right sections 16 and 18 of the base 12). Since the dimples 52 and the projections 54 are located in these lower portions, each of the projections 54 is slightly biased into being seated within one of the dimples 52, which helps to create a more tight fit of the cover 14 upon the base 12.

Figure 8:
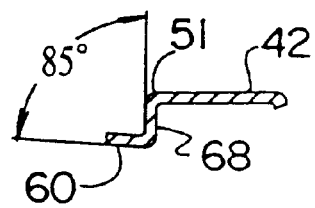
FIG. 8 is a sectional view of the cover taken along line 8—8 of FIG. 6.

A cross-sectional view taken along line 8—8 of FIG. 6 is shown in FIG. 8. As can be seen in FIG. 8, there is a small lip 68 that extends generally downwardly from the front edge 51. The second tab 60 extends generally horizontally from the bottom of the lip 68. Preferably, an angle of approximately 85° is defined between the lip 68 and the second tab 60. The upward inclination created by the 85° angle creates a preload upon the surface of the base that will be seated upon the second tab 60, as described more fully below.

Figure 9:
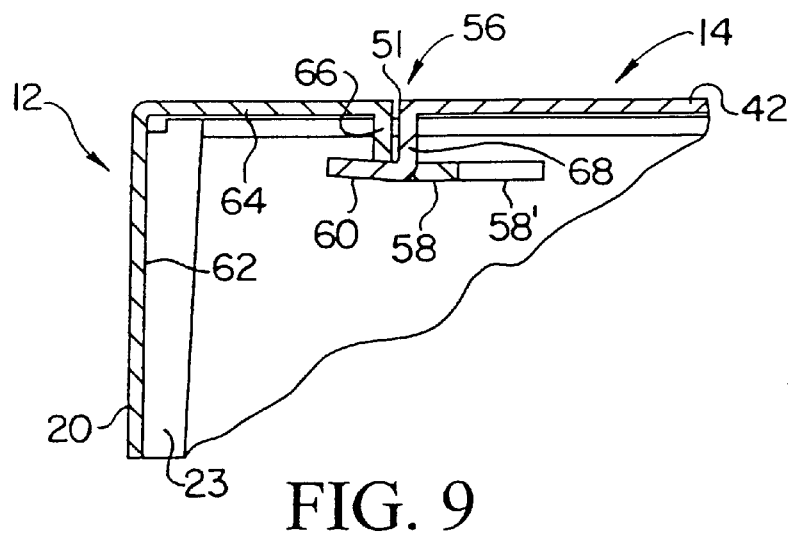
FIG. 9 is a sectional view of the hinged connection between the cover and the base, depicting the tab portion of the cover mating with the non-tab portion of the base.
Figure 10:
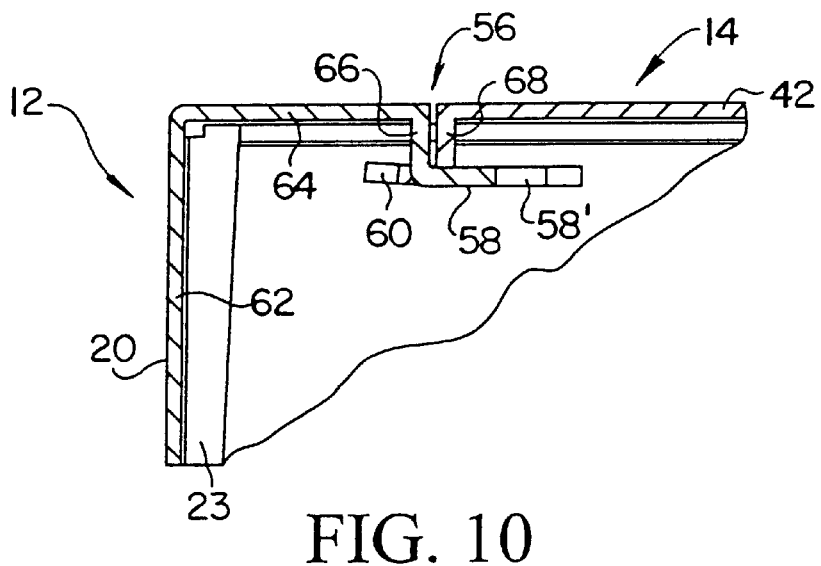
FIG. 10 is a sectional view of the hinged connection between the cover and the base that is similar to FIG. 9, except this view depicts the tab portion of the base mating with the non-tab portion of the cover.

Referring now to FIGS. 9 and 10, the interaction between the first tabs 58 and the second tabs 60 of the hinge-type connection 54 will be described in more detail. FIG. 9 is a cross-sectional view of the connection between the base 12 and the cover 14, with the section taken through one of the second tabs 60, which extend from the cover 14. FIG. 10 is a similar view to that shown in FIG. 9, except this view is taken with the section through one of the first tabs 58, which extend from the base 12.

As shown in FIG. 9, the second tab 60 creates a slight preload upon the second vertical leg 66 due to the slight inclination that is preferably provided for the second tab 60 (best shown in FIG. 8). This preload more tightly secures the top surface 42 of the cover 14 to the base 12. Since second tabs 60 alternate with first tabs 58, FIG. 9 also shows one of the first tabs 58 located behind the sectional view of the second tab 60. Such alternation between the first and second tabs keeps the cover 14 aligned along the direction of its front edge 51. FIG. 9 also shows an end portion of larger tab 58'. Since larger tab 58' is longer than the other first tabs 58, its edge extends beyond the edge of first tab 58, as depicted in FIG. 9.

Referring now to FIG. 10, a cross-section taken through one of the first tabs 58 is shown. The top surface of first tab 58 (of base 12) preferably abuts against the lower edge of the lip 68 (of cover 14), and extends slightly below the top section 42 of the cover 14, as there is no second tab (60) in this area. However, since there is a second tab 60 behind the first tab 58, the side edge of this second tab 60 can be seen in FIG. 10. The side edge of the larger first tab 58' can also be seen in FIG. 10 since this larger first tab 58' extends further below the cover 14 than the first tab 58 shown in cross-section.

As can be recognized from a review of the figures, especially FIGS. 9 and 10, the hinge-type connection 56 formed between the set of first tabs 58 and the set of second tabs 60 maintains the cover in transverse alignment (via the alternating first and second tab arrangement), and supports the front edge 51 of the top section 42 of the cover 14 (via the interaction between lip 68 and first tab 58 and the interaction between leg 66 and second tab 60).

Figure 11:
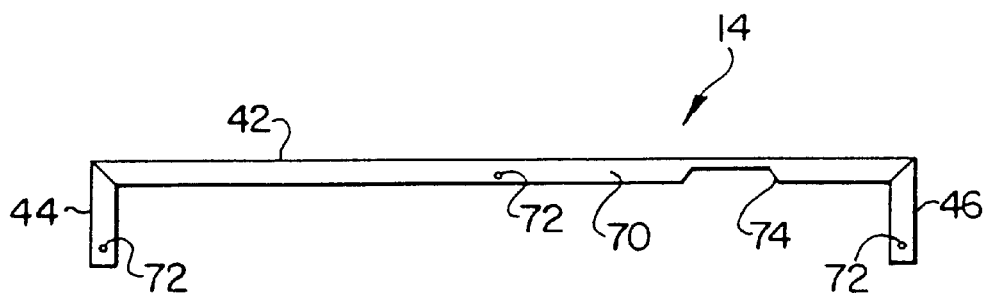
FIG. 11 shows the cover of the present invention, as seen from the rear.

FIG. 11 shows a view of the rear section of the cover 14. A fold-over portion 70 is preferably folded over from each of the three sections (top section 42, right section 44, and left section 46) to create and area for securing the cover 14 to the rear section 22 of the base 12. If desired, a recess, such as recess 74, may be provided so that the fold-over portion 70 does not block the fan air holes 76 (FIG. 1). Other similar recesses may also be provided to accommodate other air holes or other types of components as necessary. Three apertures 72 are preferably provided in the fold-over portion. Three corresponding threaded apertures 74 (FIG. 1) are provided in the rear section 22 of the base 12 so that a screw can be inserted through each of the screw apertures 72 and into the threaded apertures 74 to hold this area of the cover 14 to the base 12. Although three screw apertures and three threaded apertures are shown and described, a greater or a lesser number of apertures of each type may also be provided if desired, as long as the number of threaded apertures corresponds to the number of screw apertures.

A summary of the process for connecting the cover 14 to the base 12 will be provided next, while primarily referring to FIGS. 1 and 2. Initially, the first tabs 58 (on the base) and the second tabs 60 (on the cover) are mated with each other to form the hinge-type connection 56, as shown in FIG. 2. Next, the rear of cover 14 is lowered onto the base 12 so that the projections 54 mate with the dimples 52. Finally, screws are inserted into the screw apertures 72 (FIG. 11), and are tightened into the threaded apertures 74 (FIG. 1) so that the cover 14 is firmly secured to the base 12. As can be seen, the preferred embodiment only utilizes threaded fasteners on one side (its rear face), and the number of threaded fasteners used is relatively small (preferably three). However, as described above, a different number of threaded fasteners may also be utilized, if desired. Additionally, if necessary, threaded fasteners may also be used to secure the side surfaces together. However, use of such additional fasteners will diminish the cost savings realized by using fewer threaded fasteners that are only positioned on a single side of the housing.

As shown by the preferred embodiment described above, the present invention provides a housing in which assembly of the cover to the base should be relatively inexpensive since relatively few screws are required, and the housing need not be rotated or otherwise accessed on different sides to insert those screws. However, a secure fit between the housing and the base is achieved via the combination of the screws, the hinge-type connection and the mating of the dimples and projections. Additionally, the dimple/projection arrangement also aids in reducing the electromagnetic noise emitted from the device by disrupting the electromagnetic signals before as they pass through the housing walls.

While a particular embodiment of the housing for computer components of the invention has been shown and described, it will be appreciated by those skilled in the art that changes and modifications may be made thereto without departing from the invention in its broader aspects and as set forth in the following claims.

What is claimed is:

1. A housing for computer components comprising:
   a base including at least a first section and a second section;
   a cover including at least a third section and a fourth section, where said third section of said cover is configured and arranged to face said first section of said base and said fourth section of said cover is configured and arranged to face said second section of said base;
   a plurality of dimples and a plurality of projections corresponding to said dimples, said dimples and said projections being configured and arranged to mate with each other to aid in securing said cover to said base; and
   a plurality of first tabs located on said base, and
   a plurality of second tabs located on said cover;
   wherein said first tabs and said second tabs are configured and arranged to cooperate with each other to form a hinge-type connection between said base and said cover.

2. The housing according to claim 1, wherein said dimples are located on said first and second sections of said base and said projections are located on said third and fourth sections of said cover.

3. The housing according to claim 1, wherein:
   said base further includes a generally horizontally-extending bottom section, and said first section and said second section extend in a generally vertical manner from opposite sides of said bottom section; and
   said cover includes a generally horizontally-extending top section, and said third section and said forth section extend in a generally vertical manner from opposite sides of said top section.

4. The housing according to claim 3, wherein:
   said dimples are located on outer surfaces of said first and second sections of said base, such that indented portions of said dimples on said first section face away from said dimples on said second section; and
   said projections are located on inner surfaces of said third and fourth sections of said cover, such that projecting portions of said projections on said third section face toward projecting portions of said projections on said fourth section.

5. The housing according to claim 4, wherein:

said first section and said second section of said base each include an inner surface, and further wherein each of said dimples defines a projection on an associated one of said inner surfaces; and said third section and said fourth section of said cover each include an outer surface, and further wherein each of said projections defines a dimple on an associated one of said outer surfaces.

6. The housing according to claim 1, wherein said dimples and said projections disturb electromagnetic waves passing outside of said housing for reducing electromagnetic noise.

7. The housing according to claim 1 wherein:

said first section of said base and said third section of said cover lack any threaded connections therebetween; and said second section of said base and said fourth section of said cover lack any threaded connections therebetween.

8. The housing according to claim 1 wherein:

said first section of said base and said third section of said cover lack any threaded connections therebetween and are connected to each other solely via a mating arrangement between said projections and said dimples located thereon; and said second section of said base and said fourth section of said cover lack any threaded connections therebetween and are connected to each other solely via a mating arrangement between said projections and said dimples located thereon.

9. The housing according to claim 1 wherein:

said base filler includes a generally horizontally-extending bottom section and a front section that extends in a generally vertical manner from said bottom section;

said cover further includes a generally-horizontally extending top section;

said plurality of first tabs extending from an upper periphery of said front section; and said plurality of second tabs extending from a front edge of said cover;

wherein said first tabs and said second tabs are configured and arranged to cooperate with each other to form a hinge-type connection between said base and said cover.

10. The housing according to claim 1 wherein, when said cover is attached to said base via said hinge-type connection each of said first tabs is positioned between two of said second tabs.

11. The housing according to claim 9 wherein, when said cover is attached to said base via said hinge-type connection, each of said first tabs is positioned between two of said second tabs.

12. The housing according to claim 1 wherein each of said second tabs includes a generally horizontally extending leg that is configured and arranged to create a preload upon a portion of said front section of said base.

13. The housing according to claim 9 wherein each of said second tabs includes a generally horizontally extending leg that is configured and arranged to create a preload upon a portion of said front section of said base.

14. The housing according to claim 12 wherein said preload is generated via said generally horizontally extending leg being arranged at an angle of approximately 85° with respect to said top section of said cover.

15. The housing according to claim 13 wherein said preload is generated via said generally horizontally extending leg being arranged at an angle of approximately 85° with respect to said top section of said cover.

16. A housing for computer components comprising:

a base including at least a generally horizontally-extending bottom section, a first section extending upwardly in a generally vertical manner from a first edge of said bottom section, a second section extending upwardly in a generally vertical manner from a second edge of said bottom section, and a front section extending upwardly in a generally vertical manner from a bottom front edge of said bottom section, where said bottom front edge connects said first edge with said second edge;

a cover including at least a generally horizontally-extending top section, a third section extending downwardly in a generally vertical manner from a third edge of said top section, a fourth section extending downwardly in a generally vertical manner from a fourth edge of said top section, and a top front edge connecting said third edge with said fourth edge;

a plurality of dimples located on interior surfaces of said first and second sections of said base;

a plurality of projections located on exterior surfaces of said third and fourth sections of said cover, said projections on said cover being configured and arranged to mate with said dimples on said base to aid in securing said cover to said base as well as to disturb the flow of electromagnetic waves passing from an interior of the housing to an exterior of the housing;

a plurality of first tabs located on said front section of said base; and a plurality of second tabs located on said front edge of said cover, wherein said first tabs and said second tabs are configured and arranged to cooperate with each other to form a hinge-type connection between said base and said cover.

17. The housing according to claim 16, wherein said bottom section, said first section, said section and said front section of said base are all integrally formed from a single sheet of material; and said top section, said third section and said fourth section of said cover are all integrally formed from a second single sheet of material.

18. The housing according to claim 16 wherein:

said front section of said base is generally U-shaped in cross-section, and defines a first generally vertical leg, a generally horizontal leg, and a second generally vertical leg, where said second generally vertical leg is shorter than said first generally vertical leg;

said first tabs on said base extend in a generally horizontal direction from portions of said second generally vertical leg;

said front edge of said cover includes a lip that extends downwardly in a generally vertical direction from said front edge of said cover; and said second tabs on said cover extend in a generally horizontal direction from portions of said lip.

19. The housing according to claim 18, wherein said second tabs are tilted upwardly at approximately 85° with respect to said top section such that said second tabs create a preload upon portions of said second generally vertical leg lacking said first tabs.

20. The housing according to claim 16, wherein:

said base further includes a rear section extending upwardly in a generally vertical manner from a bottom rear edge of said bottom section;

said cover further includes a flange that extends in a generally vertical direction from said top section, said third section, and said fourth section; and a plurality of aligned apertures configured and arranged for receiving threaded fasteners for attaching said base to said cover, said apertures being located only in said rear section of said base and said flange of said cover.

* * * * *